United States Patent [19]

Flix

[11] Patent Number: 5,630,311
[45] Date of Patent: May 20, 1997

[54] APPARATUS FOR FORMING LOTS OF PRODUCTS FOR THE PACKING THEREOF

[75] Inventor: Jean-Marie Flix, Saint Germain, France

[73] Assignee: Societe A.P.I., France

[21] Appl. No.: 436,441

[22] PCT Filed: Sep. 26, 1994

[86] PCT No.: PCT/FR94/01118

§ 371 Date: Jul. 24, 1995

§ 102(e) Date: Jul. 24, 1995

[87] PCT Pub. No.: WO95/08475

PCT Pub. Date: Mar. 30, 1995

[30] Foreign Application Priority Data

Sep. 24, 1993 [FR] France ............................ 93 11546
Dec. 17, 1993 [FR] France ............................ 93 15407

[51] Int. Cl.$^6$ ........................................... B65B 35/30
[52] U.S. Cl. ................... 53/543; 198/419.3; 198/459.8; 198/467.1; 198/468.3
[58] Field of Search ...................... 53/543; 198/419.2, 198/419.3, 434, 459.8, 468.3, 467.1, 465.1, 465.2, 465.4

[56] References Cited

U.S. PATENT DOCUMENTS

| | | | |
|---|---|---|---|
| 2,752,883 | 7/1956 | Curtis | 198/459.8 X |
| 2,789,683 | 4/1957 | Stahl | 198/465.2 X |
| 3,136,404 | 6/1964 | Hebard et al. | 198/419.3 |
| 3,718,246 | 2/1973 | Dardaine et al. | 198/419.3 |
| 4,007,824 | 2/1977 | Reist | 198/465.4 X |
| 4,191,003 | 3/1980 | Talarico. | |
| 4,444,423 | 4/1984 | Montferme et al. | 198/468.3 X |
| 4,444,424 | 4/1984 | Lebret | 198/468.3 X |
| 5,161,664 | 11/1992 | LeBras | 198/419.3 |
| 5,261,520 | 11/1993 | Duke | 198/465.4 X |
| 5,359,834 | 11/1994 | Holdensguard et al. | 198/465.1 X |

FOREIGN PATENT DOCUMENTS 1152352   8/1963   Germany.

*Primary Examiner*—Daniel Moon
*Attorney, Agent, or Firm*—Ostrolenk, Faber, Gerb & Soffen, LLP

[57] ABSTRACT

An apparatus for forming, for their packing, lots of products fed by a conveyor and arranged in adjoining rows.

The apparatus comprises a transfer chain or belt (1) stretched between two drive wheels (11, 12) having vertical axes (111, 121) and provided with uniformly spaced drive means (13), each intended to hold one carriage (2) comprising a movable holding and separating means (22) intended to form a lot (31) of products (3), one of the strands (10) of said chain (1) having two offsets (14, 15), the first of which (14), located at a short distance behind the feed wheel (12) for the carriages (2), makes it possible to disconnect them from the chain (1), while a roller (242) which is firmly attached to said carriage (2) engages in the groove (51) of a variable pitch screw (5) the axis of which is parallel to the straight line connecting the two points of offset (14, 15) and the length of which is approximately equal to the distance between said two points of offset (14, 15).

8 Claims, 2 Drawing Sheets

5,630,311

APPARATUS FOR FORMING LOTS OF PRODUCTS FOR THE PACKING THEREOF

FIELD OF THE INVENTION

The present invention is related to an apparatus for forming lots of products and separating said lots from each other for the packing thereof.

DESCRIPTION OF RELATED ART

Systems for separating products by means of variable pitch screws are known at the present time, but they can only form lots in the form of a row or several rows of units arranged side by side with a relatively large distance between them and not lots of grouped products.

In automatic installations for the handling of bottles or vertical flasks for the packing of them in cartons, use has been made for a long time of series of gripper heads, mounted on the same common support of a machine, of a cylinder-piston unit or any other apparatus, which are provided with gripping means intended to grasp, for instance, the necks of bottles at a first station and release them at a second station where the lots thus formed are packed.

However, these types of installations do not make it possible to operate continuously and they comprise complicated mechanical means which are subject to breakdowns which make it necessary to interrupt the operation of the production line in order to install new pieces.

SUMMARY OF THE INVENTION

The object of the present invention is to overcome these drawbacks by providing an apparatus which makes it possible to operate continuously without the necessity of transferring products such as bottles from one station to another.

The apparatus in accordance with the invention is intended to be placed at the entrance of the products to be packed which are transported by a conveyor and arranged in contiguous rows, and it is characterized essentially by the fact that it comprises a transfer chain or belt which is stretched between two drive wheels with vertical axes and is provided with uniformly spaced fixing means each intended for the attachment of a carriage having a movable separation and holding element of hood type, with or without gripper, the function of which is to cover a given number of products so as to form a lot from them, one of the strands of said chain having two offsets, the first located at a short distance behind the feed wheel for the carriages, or making it possible to disconnect the carriages from the chain upon their passage, the fastening of said carriages to the chain being then relayed by the engagement, into the groove of a variable pitch screw having its axis parallel to the straight line joining the two points of offset, of a roller which is firmly fastened to said carriage and which continues the driving of the carriage and therefore of the lot, progressively creating an increasing space between said carriages and therefore between the successive lots, the carriages being hooked again to the chain when they arrive at the place of the second offset, which is located a short distance in front of the return wheel for the carriages.

The sequence of the operations is as follows: First of all, the carriages are brought, at the speed of the transfer chain, above the products to be packed, towards the first offset where their speed is reduced upon the shift effected by engagement of the rollers in the variable pitch screw the pitch of which is initially reduced over a certain length of said screw in order to permit the placing side by side of a number of carriages the hood of which is then moved in translation temporarily so as to cover a given number of products forming a lot, whereupon the speed of the carriages is increased by increase of the pitch of the screw while at the same time they are moved away from each other by a certain distance in order to permit the subsequent boxing of the lots and, finally, upon arriving at the place of the second offset, which is located substantially at the end of the variable pitch screw, said carriages are again hooked to the transfer chain, the hood regaining its initial position, while the lot of products is taken over by a second chain provided with means for holding said lots for their boxing.

In one particular embodiment which permits the formation of lots of variable configuration by relative displacement of the products with respect to each other and/or by the removal, from the waiting line, of a number of products different from the number of products forming the lot, the hoods comprise, on the one hand, gripping means, known to the person skilled in the art, which act upon their ascent and make it possible to grasp one or more product units, said gripping means being driven by a programmable robot which defines the units which are to be removed from the lot and returned into the product arrival line; and furthermore, said hoods may comprise several compartments of parallelepiped shape each of which compartments is intended to cover a row of products, the compartments being movable in translation with respect to each other under the effect of suitable means such as a set of connecting rods connecting the different compartments together and itself connected to a suitable mechanical apparatus which controls the relative displacement of one or more compartments with respect to the others.

The advantages and characteristics of the present invention will become more clearly evident from the following description, read with reference to the accompanying drawing, which is given merely by way of illustration of the invention and in no way limits it.

BRIEF DESCRIPTION OF THE DRAWINGS

In the accompanying drawing.

DETAILED DESCRIPTION OF THE DRAWINGS

Figure 1:
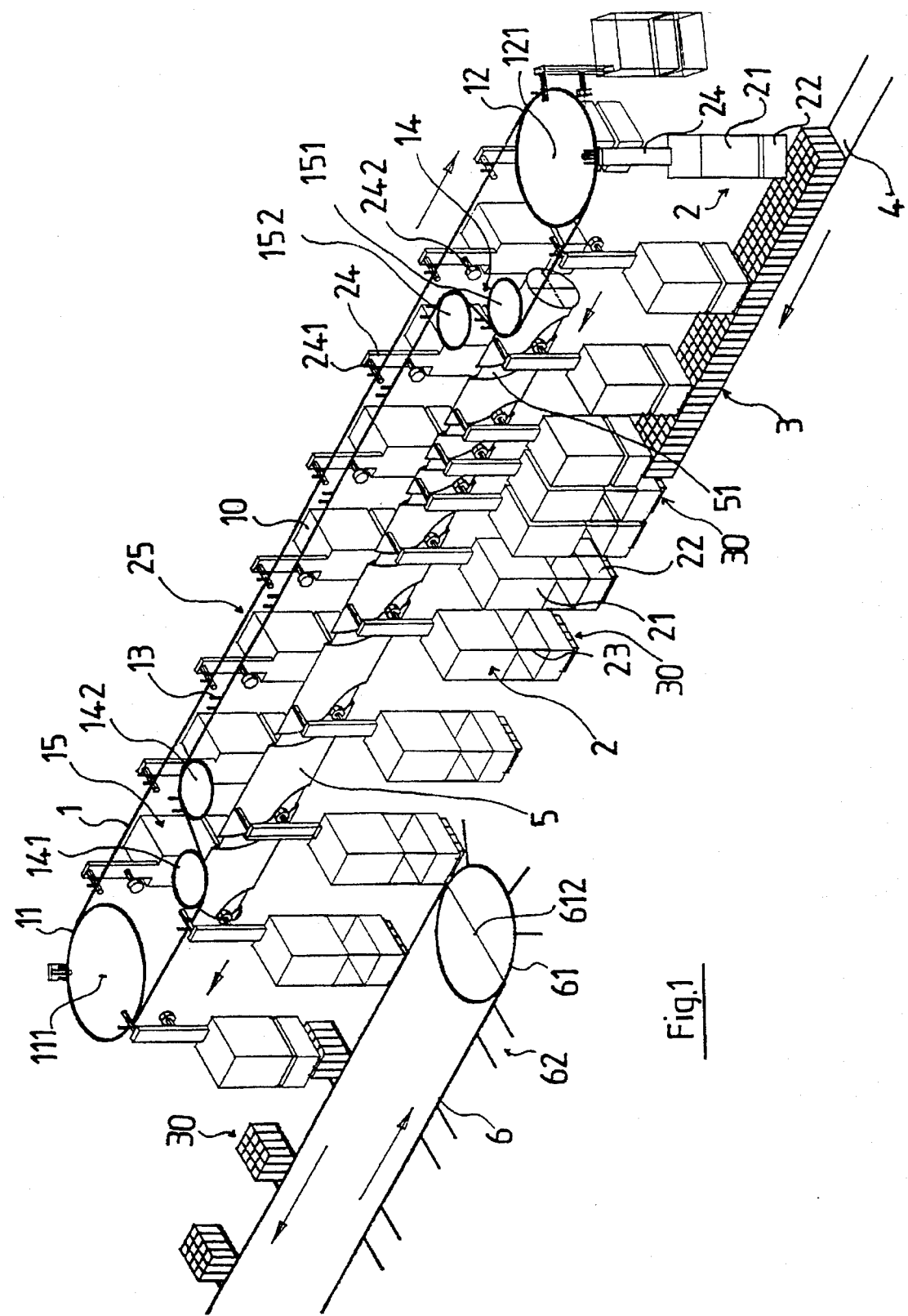
FIG. 1 is a diagrammatic view, in perspective, of an apparatus in accordance with the invention applied to the packing of lots of bottles.

Referring to FIG. 1, it can be seen that the apparatus in accordance with the invention comprises a chain 1 which is stretched between two drive wheels 11 and 12 having vertical axes 111 and 121 and is provided with uniformly spaced pairs of spurs 13, carriages 2 comprising a body 21 fastened at its lower part to a hood 22 which is movable in vertical translation by means of a hydraulic piston-cylinder unit, not shown, and is guided by rods 23, the body 21 having, at its upper part, a vertical lug 24 to the end of which there is fastened a hooking finger 241 which permits the attachment of the carriage 2 to the chain 1 by insertion of said hooking finger 241 into a pair of spurs 13, the vertical lug 24 furthermore having at its center a roller 242 the axis of which is parallel to the finger 241.

It can also be noted that the chain 1, on its strand 10, has two offsets 14 and 15, each created by two idle wheels 141, 142 and 151, 152 which are located in the same horizontal plane and below which there is positioned a screw 5 with groove 51 of variable pitch, the axis of which is parallel to the linear strand 25 of the chain 1 and the length of which is approximately equal to the distance between the two wheels 151 and 141 which are closest to the drive wheels 11 and 12 of the chain 1.

The feed wheel 12 of the carriages 2 is located approximately at the place of and above the entrance of the bottles 3, which are arranged upright on a conveyor 4 and presented in four contiguous rows.

Furthermore, a second chain 6 can be noted, stretched between two wheels with vertical axis of which only the wheel 61 and its axis 612 are shown, they being arranged parallel to the chain 1 and on which there are radially fastened pairs of tappets 62, spaced apart by the width of one lot, in the present case a lot of twelve bottles.

The operation of the apparatus is as follows: The carriages 2 arrive via the wheel 12 at a speed v, the hood 22 being in its upper position above the bottles 3 to be packed; they then encounter the offset 14 which disconnects the finger 241 from the pair of spurs 13 while at the same time the roller 242 penetrates into the groove 51 of the variable pitch screw 5 and they are then decelerated by decrease of the pitch of the screw to a speed v' which is sufficiently low that the hood 22 can descend and cover a lot 30 of twelve bottles 3, which lot is then taken over by the carriage 2 and the hood 22, sliding on the conveyor 4, and which is then accelerated by increase of the pitch of the screw 5 until again reaching approximately the speed v, a pair of tappets 62 of the chain 6 then clasping the lot 30 of bottles 3, while the carriage 2 encounters the offset 15 and is taken over by the chain 1 due to the attachment of the finger 241 to a pair of spurs 13, while the roller 242 leaves the pitch of the screw 5, the hood 22 being simultaneously lifted into its upper position, freeing the lot 31 held by the tappets 62.

Figure 2A:
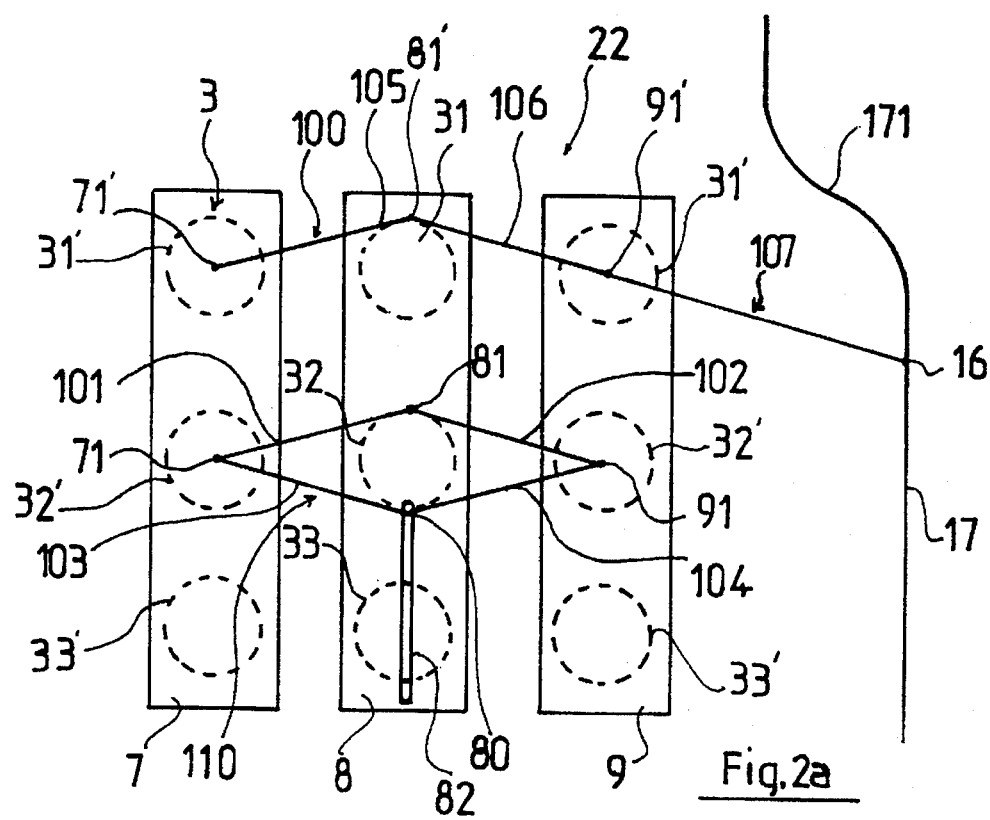
FIGS. 2a and 2b are diagrammatic plan views of a hood in accordance with one particular embodiment, shown in two different configurations.
Figure 2B:
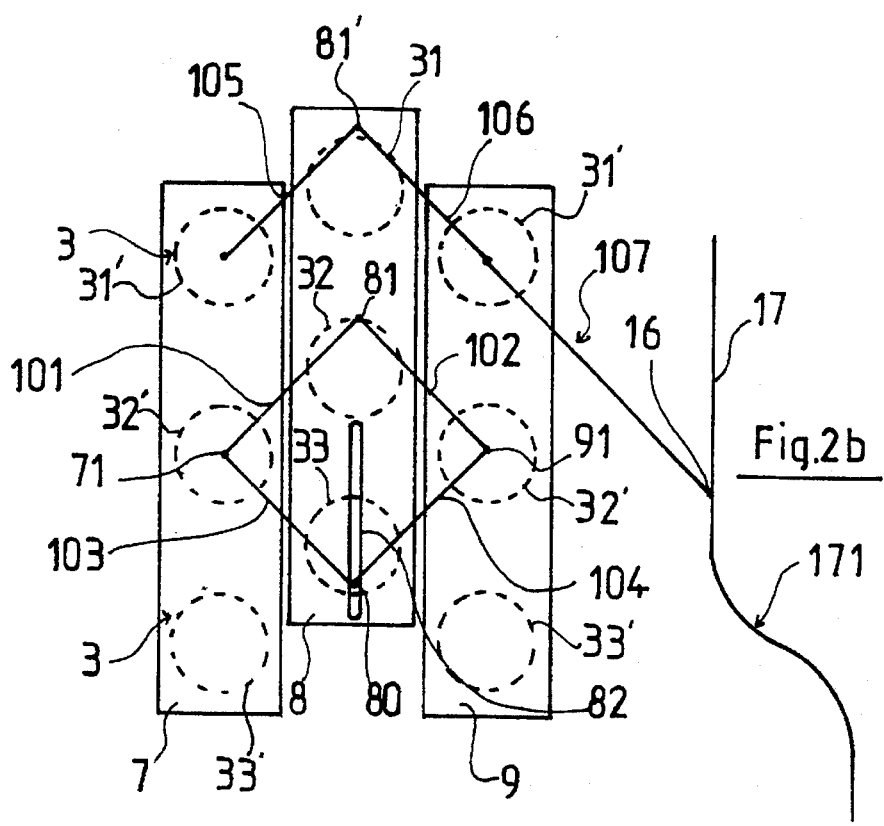

Referring now to FIGS. 2a and 2b, it can be seen that a hood 22 is formed essentially of three elements of parallelepiped shape 7, 8, and 9, connected together by connecting rods 100, four of which rods, 101, 102, 103, and 104, form a deformable parallelogram 110, the rods 101 and 102 being articulated at their two ends around pins 71, 81, and 91 which are fixed on the parts 7, 8, and 9 respectively, the pins 71 and 91 being on the same line, when the parts 7, 8, and 9 are perfectly aligned and the pin 81 being in front so as to form an angle between the connecting rods 101 and 102, while the connecting rods 103 and 104 are articulated at one of their ends around pins 71 and 91 and at their other end around a pin 80 which can move freely in an oblong guide 82 provided longitudinally in the part 8.

Two connecting rods 105 and 106 are parallel to the connecting rods 101 and 102 and are articulated around pins 71', 81', and 91' located in the same alignment as the pins 71, 81, and 91 and fastened to the end of the parts 7, 8, and 9, the connecting rod 106 having an extension 107 which, at its free end, has a roller 16 which comes against a guide 17 having an offset 171.

Thus, with the operation of the apparatus shown in FIG. 1, when the roller 16 encounters the offset 171, the part 9 is retained and brought, via the connecting rods 102 and 106, against the part 8 set back from the latter, causing, by the deformation of the parallelogram 110, the coming together of the part 7 and the part 8 at the same height as the part 9, which results in a displacement of the bottles 3 aligned under the part 8 with respect to the bottles 3' held by the parts 7 and 9, conferring a different configuration on the lot thus formed.

Furthermore, the parts 7, 8, and 9 may comprise retaining means, not shown, known to the person skilled in the art, which make it possible to hold back certain bottles 3 upon the ascent of the hood 22, the units which have been removed being returned into the feed line of the products 3, which makes it possible to modify in another way the configuration of the lot by varying the number of products constituting it.

In the embodiment shown, only the bottle 31 is held back, the other two bottles 32 and 33 being contained between the bottles 31' and 32' and 32' and 33' respectively.

It goes without saying that the present invention is not limited to the above description and that it is capable of a number of modifications without thereby going beyond the scope of the invention.

I claim:

1. An apparatus for forming, for their packing, lots of products fed by a conveyor and arranged in contiguous rows, said apparatus being characterized by comprising:

a plurality of carriages (2, 2, etc.) each comprising a movable holding and separation means (21–33, etc.) for forming a lot (30) of products (3);

a transfer chain (1) stretched between first and second feed wheels (11, 12) having respective vertical axes (111, 121), said chain (1) being provided with uniformly spaced drive units (13) each intended for holding one of said carriages (2) to carry same downstream from said first wheel (11) to said second wheel (12);

said chain (1) extending along a path having first and second points of offset (14, 15), with the first point of offset (14) being upstream of said second point of offset (15) and being located a short distance downstream of the second feed wheel (12);

said chain (1) including a strand (10) that runs downstream from said first point of offset (14) to said second point of offset (15), with said strand (10) being disposed so that said drive units (13) on said strand (10) are free of driving engagement with said carriages (2) while traveling downstream from said first point of offset to said second point of offset;

a variable pitch screw (5) having an axis which is generally parallel to a straight line extending between the first and second points of offset (14, 15), said screw (5) having a length which is approximately equal to a distance by which said first and second points of offset (14, 15) are separated from each other, said screw (5) having a variable pitch groove (51);

each of said carriages (2) having a roller (242) attached thereto and engageable in said groove (51) while said carriage (2) is free of driving engagement with said drive units (13) whereby rotation of said screw (5) is effective to move said carriages (2) downstream from said first point of offset (14) to said second point of offset (15).

2. An apparatus according to claim 1 characterized by having each of the points of offset (14, 15) established by a pair of wheels (141, 142, and 151, 152) located in a horizontal plane wherein the feed wheels (11) (12) are also located;

said variable pitch screw (5) being arranged below the wheels (141, 151) of said points of offset (14, 15), respectively, and parallel to a plane containing said chain; and said screw (5) having a length approximately equal to the distance between said wheels of said points of offset (141, 151).

3. An apparatus according to claim 1, characterized by having the screw (5) formed with a pitch that decreases initially after the first point of offset (14) and then increases until the second point of offset (15).

4. An apparatus according to claim 1, characterized by also having another chain (6), arranged parallel to the chain (1);

said movable holding and separation means (22) including a vertically movable hood;

said another chain (6) having pairs of tappets (62) spaced apart by a width of a lot (30), said tappets clasping said lots (30) prior to ascent of said movable hood (22).

5. An apparatus according to claim 1, characterized by having each of the drive units (13) constituted by an individual pair of spurs that is operatively engageable with a hooking finger (241) fastened to a connecting lug (24) which is attached to a body (21) of said holding and separation means (21–23, etc.), said holding and separation means (21–23, etc.) also including movable hood (22) at a lower part of said carriage (2).

6. An apparatus according to claim 5, characterized by providing each of the hoods (22) with an individual gripping means, and said gripping means acting to grasp several units of products while said hoods (22) ascend.

7. An apparatus according to claim 5, characterized by having the hoods comprise several compartments of parallelepiped shape (7, 8, 9);

a set of connecting rods (100) which connect the compartments (7, 8, 9) to each other for movement of the compartments (7, 8, 9) in translation with respect to each other under the effect of movement by said set of connecting rods (100); and a mechanical apparatus (107, 16, 17) connected to said set of connecting rods (100) for controlling relative displacement of at least one of said compartments with respect to remaining ones of said compartments.

8. An apparatus according to claim 7, characterized by providing each of the hoods with an individual gripping means, and said gripping means acting to grasp several units of products while said hoods ascend.

* * * * *